United States Patent [19]

Hoffman et al.

[11] Patent Number: 5,047,157

[45] Date of Patent: Sep. 10, 1991

[54] COOLANT FILTRATION

[75] Inventors: James R. Hoffman; Michael A. Ward, both of Cincinnati, Ohio

[73] Assignee: Cincinnati Milacron Inc., Cincinnati, Ohio

[21] Appl. No.: 529,018

[22] Filed: May 25, 1990

[51] Int. Cl.⁵ .................... B01D 35/027; B01D 21/26; B04C 11/00
[52] U.S. Cl. .................................. 210/787; 210/167; 210/171; 210/257.1; 210/258; 210/259; 210/304; 210/312; 210/512.1; 210/805
[58] Field of Search .................. 138/41, 42; 210/167, 210/171, 257.1, 258, 259, 304, 312, 332, 335, 433.1, 512.1, 787, 791, 805, 409

[56] References Cited

U.S. PATENT DOCUMENTS

| | | | |
|---|---|---|---|
| 3,235,090 | 2/1966 | Bose et al. | 210/512.1 |
| 3,341,983 | 9/1967 | Baldenhoffer et al. | 210/512.1 |
| 3,346,117 | 10/1967 | Page, Jr. | 138/42 |
| 3,368,681 | 2/1968 | Kasten | 210/312 |
| 3,433,361 | 3/1969 | Ades | 210/512.1 |
| 3,510,890 | 5/1970 | Estabrook | 210/167 |
| 3,840,120 | 10/1974 | Greenberg | 210/258 |

FOREIGN PATENT DOCUMENTS

| | | | |
|---|---|---|---|
| 1218089 | 5/1960 | France | 210/512.1 |
| WO8910795 | 11/1989 | PCT Int'l Appl. | 210/512.1 |

OTHER PUBLICATIONS

Advertising Brochure—Cincinnati Milacron Inc., Publication No. L-604-2, Dated Mar., 1987.
Photocopies of Selected Pages of LAKOS Separator Catalog: pp. 1, 2, 9, 11, 15, and 16.
Advertisement From German Magazine *Werkstatt und Betrieb*, Jul. 1990; Wagner Machine Co.
English Translation of *Werkstatt und Betrieb* Article Entitled. "Proper Maintenance of Coolants", pp. 311-313.

*Primary Examiner*—W. Gary Jones
*Assistant Examiner*—Matthew O. Savage
*Attorney, Agent, or Firm*—Thomas M. Farrell

[57] ABSTRACT

A centrifugal particulates filter has inlet and outlet ports for coolant flow, and a flushing port for handling particulates removed from the main coolant stream. The flushing port is connected to a coiled capillary tube to maintain a constant drain flow of particulates and coolant, the coolant being recycled to the coolant tank.

2 Claims, 2 Drawing Sheets

COOLANT FILTRATION

BACKGROUND OF THE INVENTION

The invention relates to coolant filtration in a machine which has a pump and tank unit for supplying pressurized coolant to the machine, and wherein the coolant supply line is connected to a commercial coolant filter. The commercial filter has inlet and outlet ports for coolant, and a flushing port for removing particulates contamination from the coolant.

The invention is especially usable in systems in which the expected particles comprise metal granules, and identifiable flakes or chips, such as those produced in turning and milling machines.

One commercial filter unit to which the invention is particularly well suited is the LAKOS In-Line Separator, available from Lakos Separators U.S.A., 1911 N. Helm, Fresno, California 93703 which is a centrifugal unit where incoming coolant is swirled through a helical path which causes the particulates contaminants to drop to the bottom of the unit, at a flushing port.

In order to properly flush this commercial filtration unit, the manufacturer has suggested several methods and apparatus for flushing the unit: (a) an on/off air-operated or direct solenoid-operated gate valve, for periodic flushing; (b) a pinch valve, for example, one having an air-operated rubber diaphragm adjustable to permit a small continuous bleed of contaminants with periodic automatic purge when the valve is pulled to the full-open position; and (c) a constant-bleed fixed orifice.

The aforementioned prior art devices are deemed unsatisfactory because of problems encountered in use; the powered valving units are susceptible to clogging, wear, and malfunction of the moving parts, and the fixed orifice restrictor is susceptible to clogging.

SUMMARY OF THE INVENTION

It is an object of the invention to provide a coolant filter or separator with a constant bleed which is less susceptible to clogging than the prior art devices.

Another object of the invention is to provide a constant bleed means which obviates certain difficulties inherent in the prior art valving devices having powered moving parts.

In accordance with the foregoing objects, the invention is shown embodied in use with a machine having a fluid duct serially connecting a coolant reservoir, a coolant pump, and a centrifugal particulates filter, the filter having inlet, outlet and flushing ports, and an improved means for removing particulates from the filter, comprising restrictor means connected to the flushing port for effecting a predetermined drain flow of coolant and particulates to the reservoir, the restrictor means comprising a tubular conduit of predetermined length having a cross-sectional passageway sized to pass expected particulates.

DESCRIPTION OF THE PREFERRED EMBODIMENT

Figure 1:
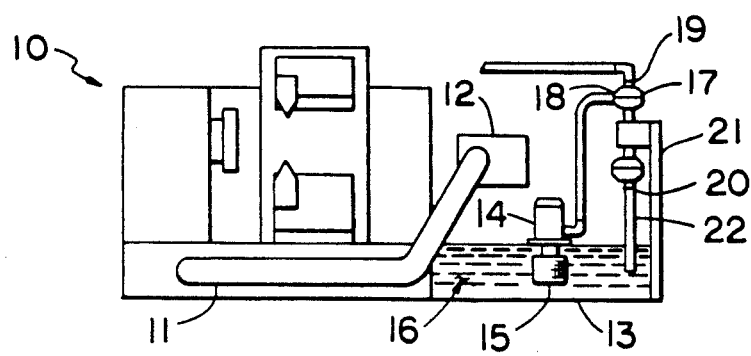
FIG. 1 is a front elevational diagrammatic view of a turning machine having a coolant supply system.

FIG. 1 of the drawings depicts, in diagrammatic form, a turning machine 10, for example, the CIN-TURN 4-axis CNC turning center available from Cincinnati Milacron Inc., the assignee of the present invention, wherein the base of the machine 10 is provided with a chip conveyor 11, well-known in the art, having a perforated metallic endless belt which collects chips falling from the work zone and conveys the chips to a clean-out box 12 located at a convenient height for an operator. Details of the chip conveyor 11 are unimportant, as it will suffice to know that the belt functions as an initial coarse screening arrangement, separating large chips and coolant falling on the belt. Coolant runs from the base of the machine to an adjacent coolant tank 13 and, occasionally, smaller chips and particulates contamination may migrate into the coolant tank 13 as well. The coolant tank 13 is fitted with a motorized pump 14 having a screened intake 15 submerged in the coolant 16. The screened intake 15 will serve as a second filter for coolant that is to be returned to the machine 10 and used in the machining processes. The pump 14 is connected to a vertically-mounted commercial filter 17, in this example a LAKOS In-Line Separator, which has an inlet port 18, an outlet port 19, and a flushing port 20 at its bottom-most end. The filter 17 is supported on a bracket 21 above the coolant tank 13 and, in most cases, the flushing port line 22 will ultimately run to the coolant tank 13, to conserve coolant which is used to flush the contaminants from the filter 17. The coolant filter 17 depicted is a centrifugal unit, where particulates are removed under the influence of centrifugal force as coolant is swirled through the unit.

Figure 2A:
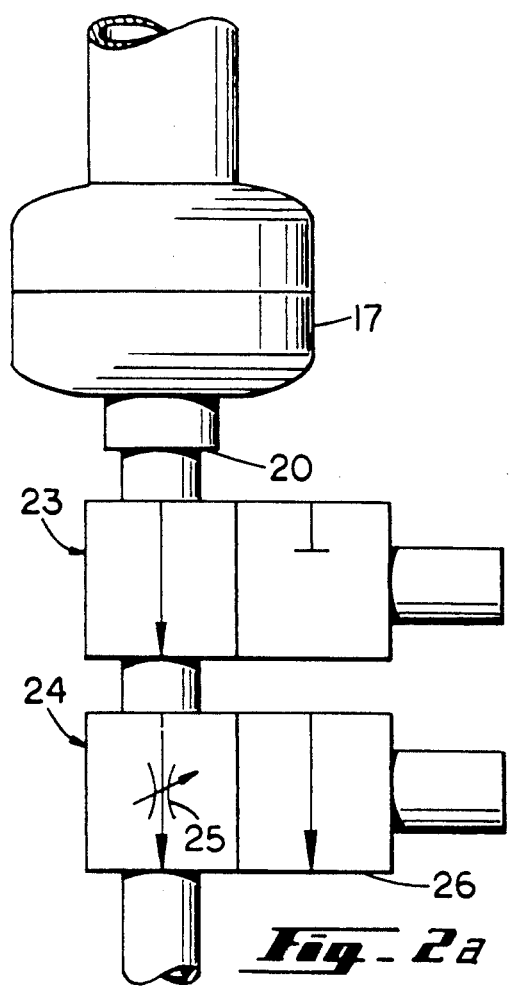
FIGS. 2(a) and (b) are front elevational diagrammatic views depicting prior art methods for purging a commercial filter of particulates contamination.

FIG. 2(a) depicts one prior art system for flushing particulates from the filter 17, where the flushing port 20 is provided with a manually actuated service valve 23 which is either fully open or blocked, for servicing the system. On the downstream side of the service valve 23, a pinch valve 24 is shown, having a variable restrictor 25 (adjustable diaphragm) in the discharge line, to provide a constant bleed from the system; an alternate valve position 26 provides straight-through flow, for periodic purging of the system. The pinch valve may be manually actuated, or may be provided with (a) direct solenoid interface, or (b) an air-powered operator controlled by a solenoid-operated air valve.

Figure 2B:
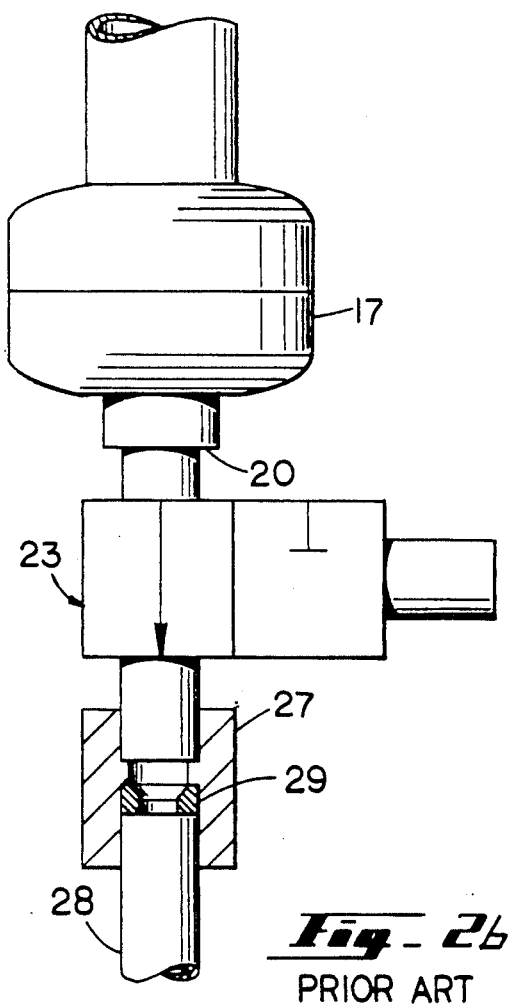

FIG. 2(b) shows the filter 17 with the manual service valve 23, and the downstream side of the valve 23 is provided a suitable connector 27 for a coolant discharge pipe 28, where the connector 27 contains an in-line fixed orifice restrictor 29.

Figure 3:
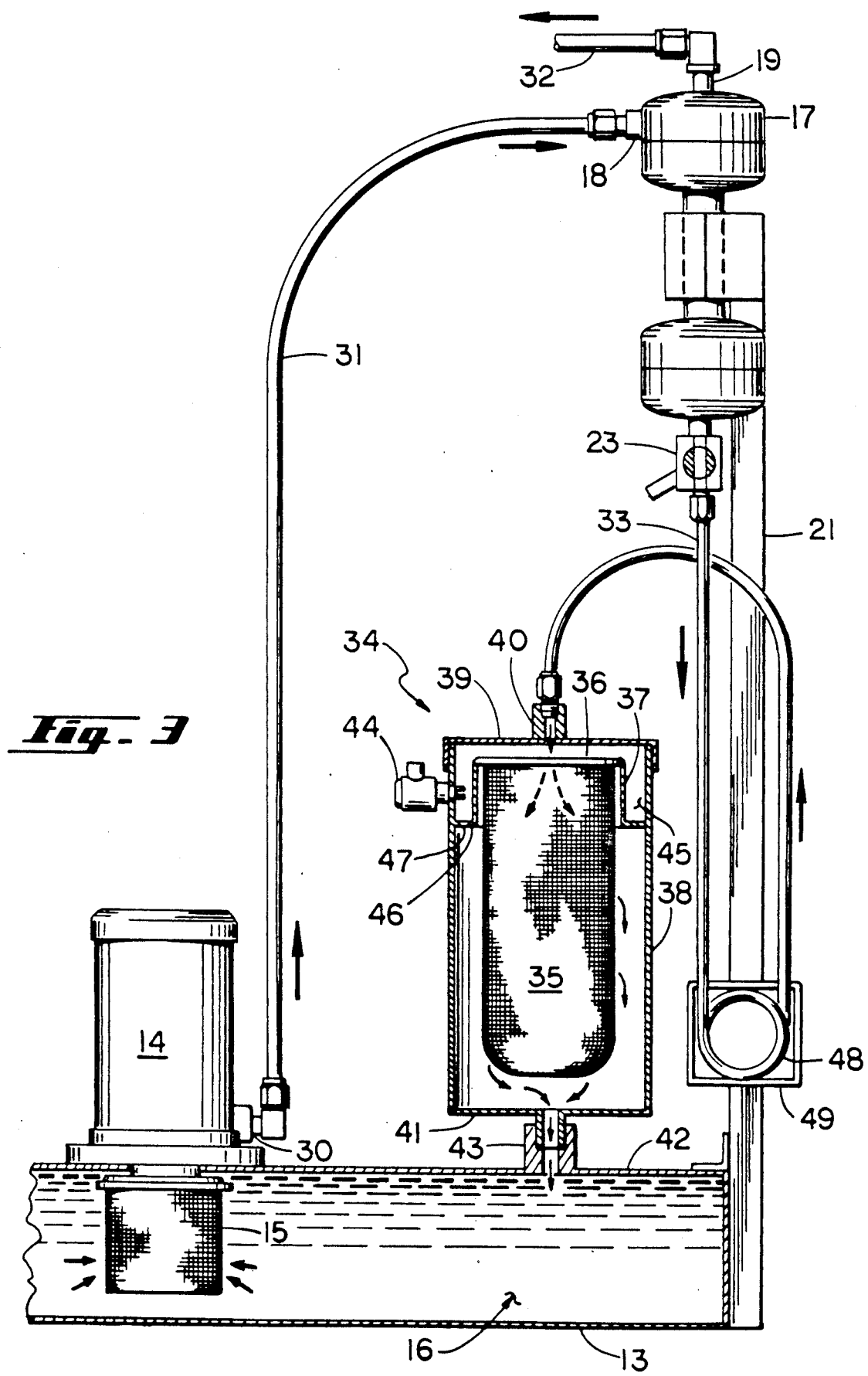
FIG. 3 is a front elevational view of the coolant tank unit of FIG. 1, employing a constant bleed filter purging system.

FIG. 3 illustrates the coolant tank 13 of FIG. 1 and the motorized pump 14, with its submerged screened intake 15. The commercial filter 17 is supported on the bracket 21 extending upward from the coolant tank 13, and, in a serial ducting arrangement, the outlet 30 of the pump 14 is connected by a tube 31 to the inlet port 18 of the filter 17; in turn, the outlet port 19 of the filter 17 has a tube 32 which runs to the machine 10. The flushing port 20 of the filter 17 is provided with a manual service valve 23, in normal operation fully open, but which may be turned to the blocked position for servicing the system. Extending downward from the manual service valve 23 is a flexible tubular conduit, in this case, cylindrical tubing 33, straight for (approximately) two feet (61 cm), coiled to a compact form and finally looped to connect with the top of a strainer unit 34. While the tubing 33 selected is soft plastic, it may be appreciated that substitute materials may be suitable. The strainer unit 34 contains a generally cylindrical filtration basket 35 made from fine mesh screen, having a closed bottom end and an open top end with a rim 36 supported on an upright cylindrical collar 37 of a cylindrical support canister 38. The support canister 38 has a removable lid 39 with a suitable coupling 40 for anchoring the tubing 33. The integral bottom 41 of the support canister 38 is threadably received with the top plate 42 of the tank 13, through a coupling 43, to drain coolant into the tank 13. It is contemplated that the basket 35 will be removed and dumped periodically by maintenance personnel and, to assist as a reminder for that function, the top portion of the canister 38 has a fluid-sensing electrical switch 44 mounted through its side, extending into a top annular chamber 45 formed by an internal flange 46 carrying the collar 37. Should the basket 35 become too full, coolant will overflow the rim 36, filling the annular chamber 45 to the level of the switch 44, even as coolant drains through holes 47 in the flange 46. The switch signal can thereby alert an operator by sounding an annunciator (not shown) or lighting a message on a control panel (not shown).

The tubing cross-sectional passageway is sized to accommodate an expected maximum chip size of 0.38 inches (9.5mm); though unlikely to do so, a thin, sliver-like chip might get through the screened intake 15 of the pump 14. In the system chosen, the pump output is 24 gallons per minute (91 liters per minute) and machine requirements are approximately 20 gallons per minute(76liters per minute), leaving four gallons per minute (15 liters per minute) for the constant bleed system. The overall length to the 0.38 inch (9.5mm) diameter tubing 33 is 41 feet (12.5m), so the coiled portion 48 of the tubing 33 is compactly stored in a box affixed to the bracket 21.

When turning aluminum parts having high surface finish requirements, such as automobile wheels, it is important to prevent chips from returning to the work zone and ruining the finish. The invention has proved excellent for this application.

While the invention is shown in connection with a preferred embodiment, it is not intended that the invention be so limited, but rather, the invention extends to all such designs and modifications as come within the scope of the appended claims.

What is claimed is:

1. In a machine having fluid duct serially connecting a coolant reservoir, a coolant pump and a centrifugal particulate separator, the separator having inlet, outlet and flushing ports, the improvement comprising:

a flexible tubular conduit of predetermined diameter and length, having a pair of open opposite ends, and a substantial portion of its length looped through a plurality of turns to form a compact coil;

bracket means for storing said compact coil; and filtration basket means supported by, and in fluid communication with, said coolant reservoir, wherein one of said pair of open opposite end sis connected to said flushing port of said particulate separator, and the other of said pair of open opposite end sis in fluid communication with said filtration basket means.

2. In a machine having a coolant supply system including a coolant tank and a centrifugal separator having an inlet port, an outlet port and a flushing port for removing particulates, a method for draining the flushing port, comprising the following steps:

providing a flexible tubular conduit of predetermined diameter and length;

looping a substantial portion of said flexible tubular conduit through a plurality of turns to create a compact coiled form;

storing said compact coiled form in a bracket means;

connecting a filtration basket means in fluid communication with said coolant tank;

connecting one end of said flexible tubular conduit to said flushing port, and the other end of said flexible tubular conduit to said filtration basket means;

continuously directing flushed coolant and particulates through said flexible tubular conduit, from said flushing port to said filtration basket means, while said inlet port of said coolant separator is being supplied with coolant;

accumulating particulates in said filtration basket means by straining said flushed coolant; and draining strained coolant from said filtration basket means into said coolant tank.

* * * * *